US011599269B2

United States Patent
Jose et al.

(10) Patent No.: US 11,599,269 B2
(45) Date of Patent: Mar. 7, 2023

(54) REDUCING FILE WRITE LATENCY

(71) Applicant: VMWARE, INC., Palo Alto, CA (US)

(72) Inventors: Prasanth Jose, Thodupuzha (IN); Gurudutt Kumar Vyudayagiri Jagannath, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 119 days.

(21) Appl. No.: 17/324,179

(22) Filed: May 19, 2021

(65) Prior Publication Data

US 2022/0300163 A1    Sep. 22, 2022

(30) Foreign Application Priority Data

Mar. 17, 2021    (IN) .............................. 202141011327

(51) Int. Cl.
*G06F 3/06*       (2006.01)
*G06F 12/08*      (2016.01)
*G06F 16/10*      (2019.01)

(52) U.S. Cl.
CPC .......... *G06F 3/0611* (2013.01); *G06F 3/0655* (2013.01); *G06F 3/0676* (2013.01); *G06F 3/0677* (2013.01); *G06F 3/0679* (2013.01)

(58) Field of Classification Search
CPC ............................ G06F 3/0611; G06F 3/0655
USPC ....................................................... 711/154
See application file for complete search history.

(56) References Cited

U.S. PATENT DOCUMENTS

| | | | | |
|---|---|---|---|---|
| 2004/0215893 | A1* | 10/2004 | Emerson | G06F 12/0888 711/131 |
| 2005/0144394 | A1* | 6/2005 | Komarla | G06F 12/0862 711/137 |
| 2011/0010503 | A1* | 1/2011 | Yamamura | G06F 12/121 711/E12.001 |
| 2014/0310253 | A1* | 10/2014 | Meng | G06F 16/2365 707/703 |
| 2020/0371964 | A1* | 11/2020 | Bhoria | G11C 29/42 |

\* cited by examiner

*Primary Examiner* — Edward J Dudek, Jr.
*Assistant Examiner* — Sidney Li
(74) *Attorney, Agent, or Firm* — Barta, Jones & Foley, PLLC

(57) ABSTRACT

Reducing file write latency includes receiving incoming data, from a data source, for storage in a file and a target storage location for the incoming data, and determining whether the target storage location corresponds to a cache entry. Based on at least the target storage location not corresponding to a cache entry, the incoming data is written to a block pre-allocated for cache misses and the writing of the incoming data to the pre-allocated block is journaled. The writing of the incoming data is acknowledged to the data source. A process executing in parallel with the above commits the incoming data in the pre-allocated block with the file. Using this parallel process to commit the incoming data in the file removes high-latency operations (e.g., reading pointer blocks from the storage media) from a critical input/output path and results in more rapid write acknowledgement.

20 Claims, 8 Drawing Sheets

REDUCING FILE WRITE LATENCY

RELATED APPLICATIONS

Benefit is claimed under 35 U.S.C. 119(a)-(d) to Foreign Application Serial No. 202141011327 filed in India entitled "REDUCING FILE WRITE LATENCY", on Mar. 17, 2021, by VMware, Inc., which is herein incorporated in its entirety by reference for all purposes.

BACKGROUND

In non-sequential file systems, write input/outputs (I/Os) arrive with file offsets that are then mapped to storage device (e.g., storage media) locations through a chain of indirection that uses pointer blocks. Before a write is issued to the storage device, the file system determines a location on the storage device for a write I/O by reading through the pointer blocks in the chain of indirection. To improve performance, file systems attempt to retain the pointer blocks in a cache in live memory. However, a large file may use multiple tiers of indirection requiring several pointer blocks, and it is often impractical to retain all of the pointer blocks in the cache.

When there is a cache miss, a pointer block is read from the storage device. A write is issued only after the read (of an indirect metadata block) is complete. Unfortunately, this increases the latency of write I/Os. When data is written to an offset for the first time, it is highly unlikely to find its corresponding pointer block in the cache, rendering first writes typically relatively slow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide a solution for reducing file write latency that includes: receiving incoming data for storage in a file (e.g., within a file system) and a target storage location for the incoming data; determining whether the target storage location corresponds to a cache entry; based on at least the target storage location not corresponding to a cache entry; writing the incoming data to a pre-allocated block, the pre-allocated block pre-allocated for cache misses; journaling the writing of the incoming data to the pre-allocated block; acknowledging the writing of the incoming data; and committing, with a parallel process, the incoming data in the pre-allocated block with the file.

BRIEF DESCRIPTION OF THE DRAWINGS

The present description will be better understood from the following detailed description read in the light of the accompanying drawings, wherein.

DETAILED DESCRIPTION

Aspects of the disclosure provide a solution for reducing file write latency. In an example involving incoming data from a data source, the incoming data associated with a write operation to a file is written to at least one pre-allocated block, and the write operation is then acknowledged to the data source. The incoming data in the pre-allocated block is later committed into the file using a parallel commit process or other background process. In this manner, the disclosure removes high-latency operations (e.g., reading pointer blocks from the storage media) from a critical input/output (I/O) path and results in more rapid write acknowledgement to the data source. Aspects of the disclosure operate in an unconventional manner at least by using pre-allocated blocks and by committing, using a parallel process, the incoming data in the pre-allocated block with the file.

Figure 1:
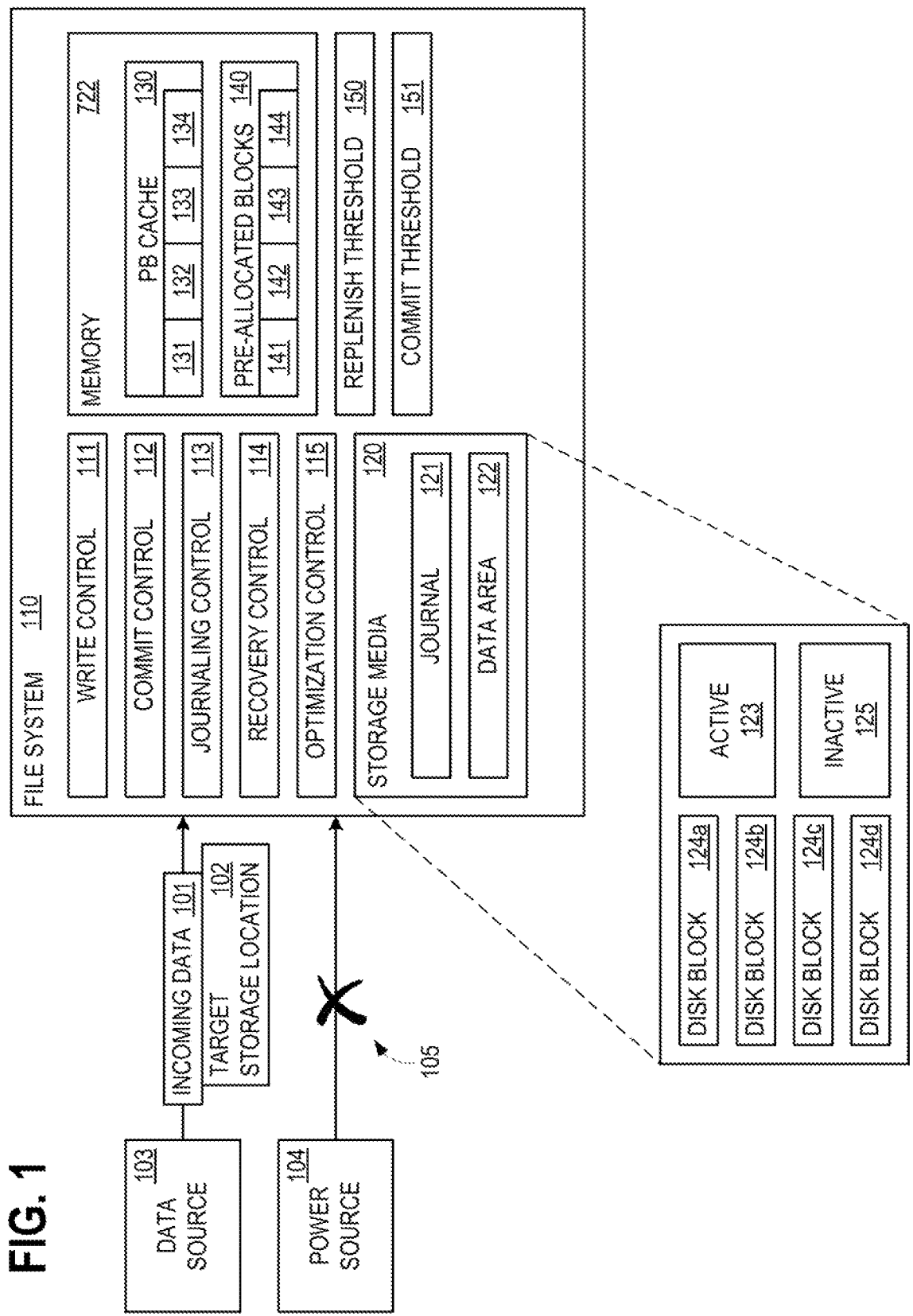
FIG. 1 illustrates an architecture that may advantageously reduce file write latency.

FIG. 1 illustrates an architecture 100 that may advantageously reduce file write latency. In some examples, file system 110 is implemented on one or more computing apparatus 718 of FIG. 7. File system 110 receives incoming data 101 (e.g., an incoming write I/O) for storage in a file 274 (see FIG. 2), along with a target storage location 102 (e.g., a file offset within file 274 and a length of incoming data 101) for incoming data 101, from a data source 103. Incoming data 101 to be written to a storage media 120 and will be committed, using a parallel process (e.g., a stitching thread, a background process, etc.), with file 274 in a data area 122 on storage media 120. Metadata for incoming data 101 is written to a journal 121. In some examples, data source 103 is a memory, such as random access memory (RAM) within the same computing device. In some examples, data source 103 is a remote node. File system 110 is powered by a power source 104. Unfortunately, power source 104 may fail, resulting in a power interruption 105, resulting in a crash in writing operations on file system 110. The initial writing of incoming data 101 is handled by a write control 111, and commit control 112 manages one or more parallel processes, to commit (merge, stitch) incoming data 101 into its position (according to target storage location 102) in file 274.

Because storage media 120 is a physical data storage device, such as one or more magnetic disks or another non-volatile storage medium, writing data into storage media 120 is not instantaneous. Instead, it requires time. If, during the time period in which data is being written into storage media 120, any of a planned shutdown (e.g., for maintenance), a power interruption 116, or some other malfunction of file system 110 occurs (e.g., a hardware failure or logic condition causes a crash), any data not yet finally written into its corresponding file will need to be addressed using crash resilience measures. Otherwise, after restoration of file system 110, data reads will return corrupt (erroneous) results.

A journaling control 113 manages journal 121, so that error recovery operations managed by a recovery control 114 are able to properly ascertain which data writing operations resulted in valid data being written to data area 122 on storage media 120, and which must still be accomplished. An optimization control 115 adjusts the operations of write control 111 and commit control 112 to balance the burden of crash resilience with the risk of an outage, as described herein. In some examples, optimization control 115 includes a machine learning (ML) component to perform the adjustments. The operations of write control 111, optimization control 115, and commit control 112 are described in relation to flowcharts 300, 350, and 370 of FIGS. 3A-3C. The operations of journaling control 113 are described in relation to a flowchart 400 of FIG. 4, and the operations of recovery control 114 are described in relation to a flowchart 500 of FIG. 5.

Figure 2:
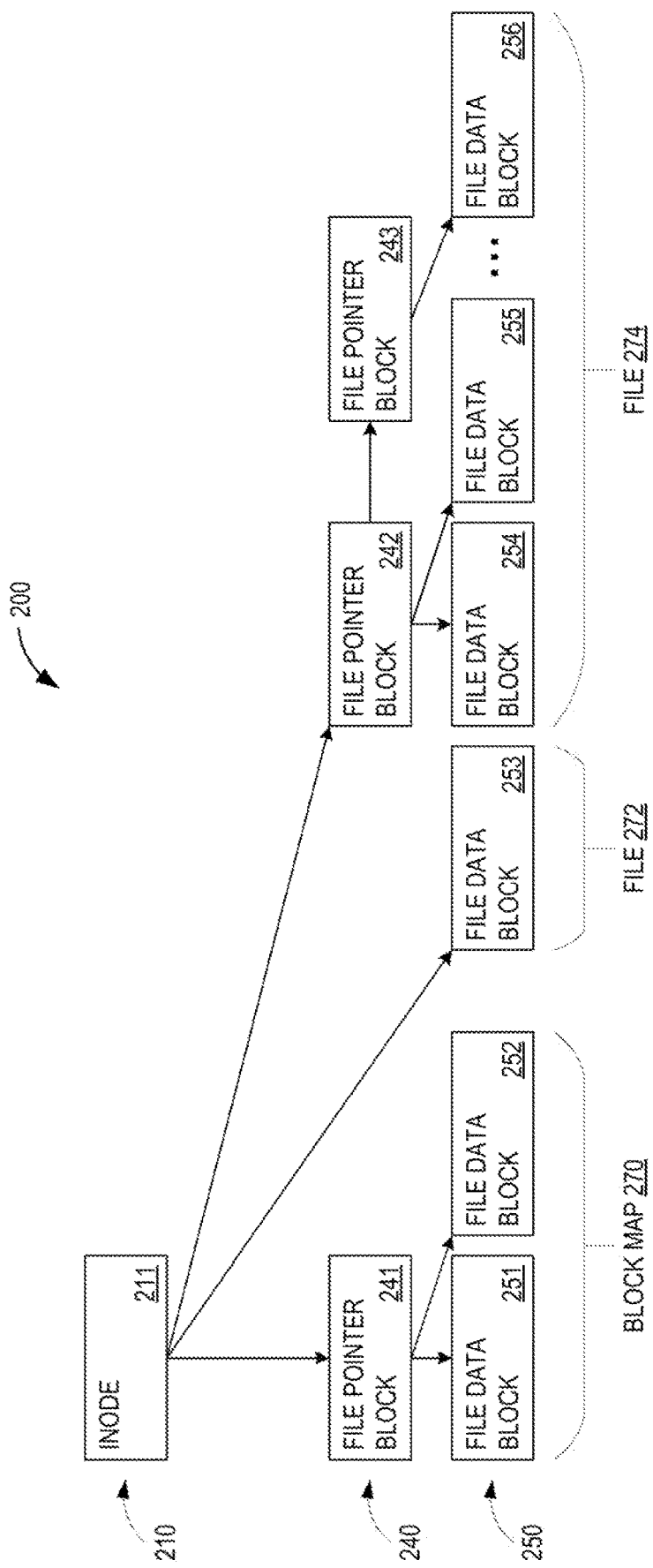
FIG. 2 illustrates storage of data using pointer blocks in the architecture of FIG. 1.

Storage media 120 (which may comprise a plurality of storage media hardware components), includes disk blocks 124a 124b, 124c, and 124d, which may be 4 Kilobytes (KB) in size, or may be a different size. A file (e.g., file 274) may be stored in a manner that spans multiple disk blocks, and in some examples, the disk blocks that are used for a particular file may not form a contiguous set, and may even be out of order on the physical media, in relation to the logical order of the date within the file. FIG. 2 illustrates further detail on the storage of files using disk blocks, as well as illustrating a chain of indirection 200 that uses pointer blocks.

As indicated, some examples partition journal 121 into an active potion 123 and an inactive portion 125. This partitioning permits metadata to be stitched (committed, merged) from an initial holding location (e.g., journal 121) into its final position within a file, concurrently with writing new data to storage media 120. Committing incoming data 101 into file 274 requires reading pointer blocks (shown in FIG. 2), that are associated with file 274, from storage media 120 in order to determine the specific disk block(s) into which incoming data 101 should be written. If the portion of storage media 120, in which this reading of pointer blocks is occurring, is subject to changes, this may delay or complicate the committing process. Thus, in some examples, the committing process (or processes, if multiple committing operations are performed in parallel) operates on inactive portion 125, while active portion 123 accepts new incoming transactions.

Active portion 123 is a set of blocks on storage media 120 where transactions are persisted (e.g., where journaling data from journal 121 is stored), in the event of a crash. This avoids blocking any new I/Os while the commit thread is running, so the commit thread has a consistent view of transactions to process. Upon completion of the committing, active portion 123 and inactive portion 125 are swapped, so committing may occur on what had been formerly active portion 123, what had been formerly inactive portion 125 starts accepting incoming write I/Os. In general, the commit thread can process transactions in a passive region in parallel to a certain extent. This can be visualized as a multi-threaded process. The main thread identifies groups of dependent transactions in the set, and then delegates processing of these groups to independent threads which work on them in parallel.

Figure 7:
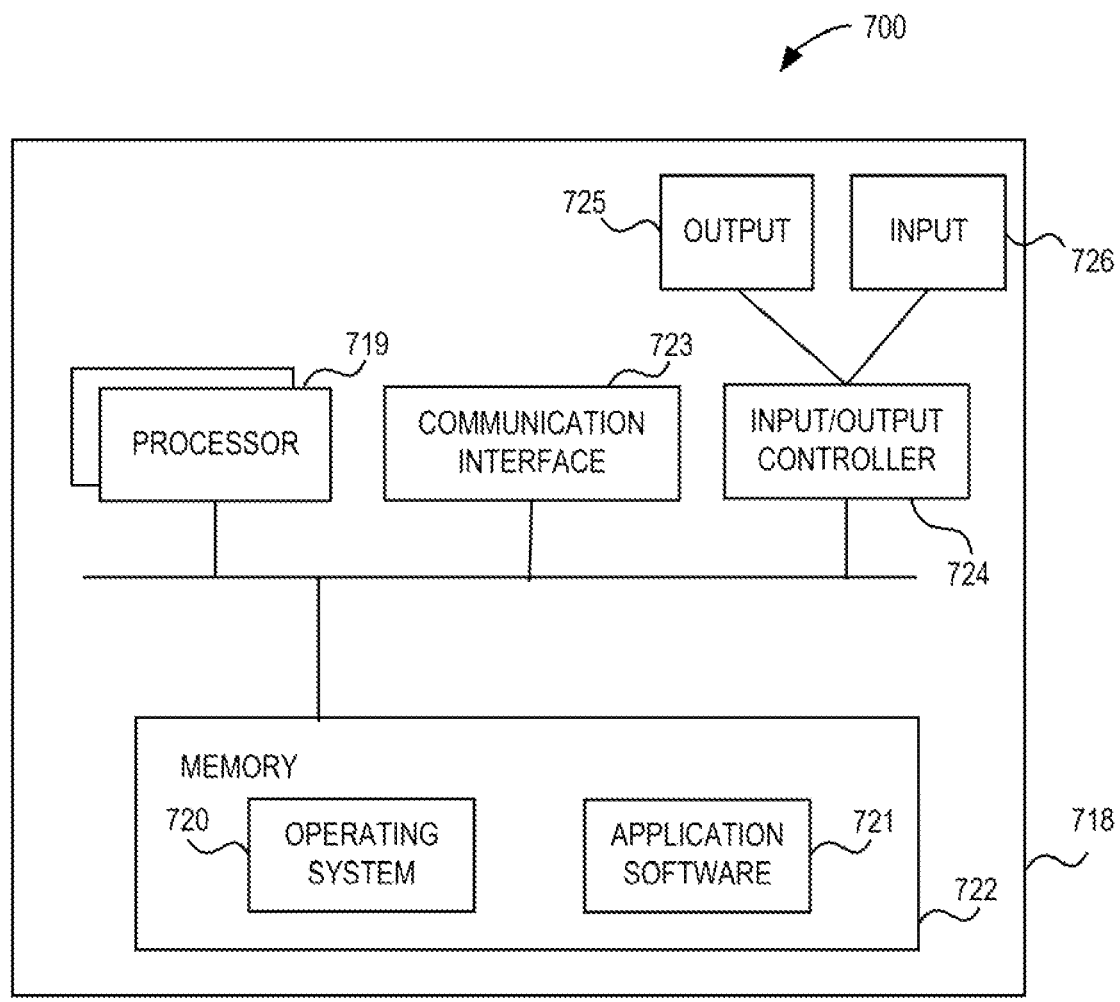
FIG. 7 illustrates a block diagram of a computing apparatus that may be used as a component of the architecture of FIG. 1, according to an example.

A memory 722, which is described in further detail in relation to FIG. 7, holds a pointer block cache 130, comprising a plurality of cache entries (e.g., cache entry 131, cache entry 132, cache entry 133, and cache entry 134). When incoming data 101 is received, write control 111 determines whether target storage location 102 corresponds to one of cache entries 131-134 within pointer block cache 130. If target storage location 102 does correspond to one of cache entries 131-134, for example cache entry 132, write control 111 writes incoming data 101 to the block indicated by the cache entry (e.g., disk block 124b indicated by cache entry 132). Otherwise, if target storage location 102 does not correspond to a cache entry, write control 111 writes incoming data 101 to one of pre-allocated blocks 140 on storage media 120 that are pre-allocated for cache misses. Pre-allocated blocks 140 include pre-allocated block 141, pre-allocated block 142, pre-allocated block 143, and pre-allocated block 144. For example, incoming data 101 may be written to pre-allocated block 142, if none of cache entries 131-134 corresponds to target storage location 102. This is more rapid than reading pointer blocks from disk (e.g., storage media 120) in order to find the proper one of disk blocks 124a-124d into which incoming data 101 should be written. Thus, write control 111 is able to acknowledge the writing of incoming data 101 to data source 103 more quickly than if pointer blocks had to be read from disk to determine whether the appropriate disk block has been allocated, if not, allocate the same before writing incoming data 101, before acknowledging the writing of incoming data 101. In this example, reading metadata is required to determine if there is a need to allocate the blocks and might have to incur allocation cost in I/O context.

If the count of available pre-allocated blocks 140 runs low for the expected rate of future incoming write I/Os (such as additional write I/Os similar to incoming data 101), additional blocks are pre-allocated for cache misses (e.g., not finding a cache entry in pointer block cache 130 that corresponds to a target storage location for an incoming write I/O). In some examples, a replenishment threshold 150 is used, and additional blocks are pre-allocated (to pre-allocated blocks 140) for cache misses if the count of blocks pre-allocated for cache misses (e.g., the count of pre-allocated blocks 140) is below replenishment threshold 150. In some examples, optimization control 115 dynamically adjusts replenishment threshold 150, for example increasing replenishment threshold 150 for burst or otherwise rapid incoming write I/Os, and/or relaxing replenishment threshold 150 when the rate of incoming write I/Os is expected to drop. In some examples, writing of incoming data 101 is journaled in journal 121 by journaling control 113, although journaling may not be required, in some examples, to experience advantages of the disclosure.

Figure 3A:
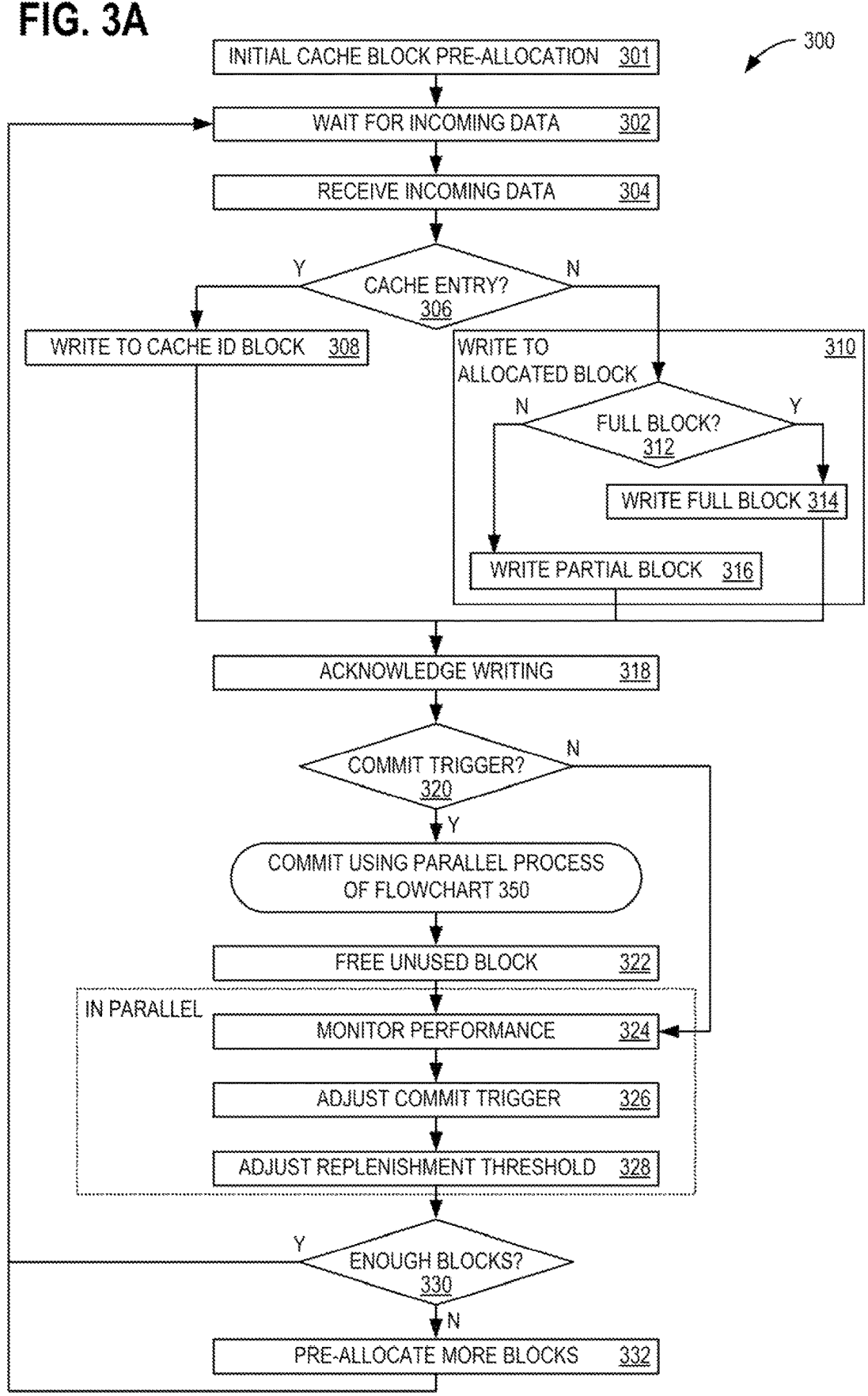
FIGS. 3A, 3B, and 3C illustrate flowcharts of exemplary operations associated with the architecture of FIG. 1.
Figure 3B:
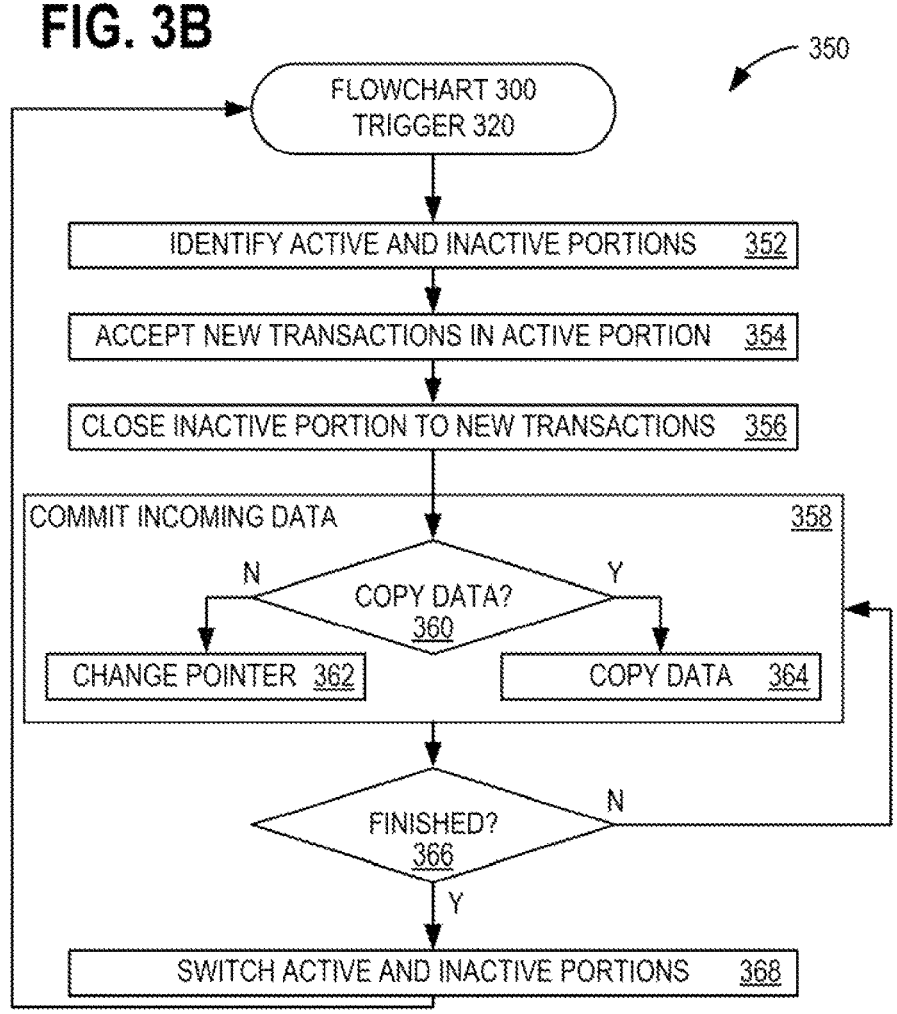

Committing occurs when triggered, and a commit trigger threshold 151 indicates a count of pending journal entries, such that when the count of pending journal entries meets or exceeds commit trigger threshold 151, a committing process is initiated (as shown in FIG. 3B). Similarly as with replenishment threshold 150, commit trigger threshold 151 may be dynamically adjusted by optimization control 115 response to the rate of incoming write I/Os (e.g., decreasing for bursty or otherwise rapid incoming write I/Os, and/or increasing when the rate of incoming write I/Os is expected to drop).

FIG. 2 illustrates storage of data using pointer blocks, in chain of indirection 200, for file system 110 of architecture 100. Chain of indirection 200 includes an inode 211 at a lowest tier 210. An inode is a data structure that stores directory and file property information. As illustrated, inode 211 identifies a file pointer block 241 and a file pointer block 242, at a tier 240, for a block map 270, which maps files to disk blocks (e.g., maps file 274 to one or more of disk blocks 124a-124d). File pointer block 241 points to a file data block 251 and a file data block 252, at a tier 250, which contains the actual data within block map 270. File pointer block 242 maps portions of file 274 to file data block 254 and file data block 255, and indicates, a further layer of indirection by also pointing to a file pointer block 243. File pointer block 243 points to another file data block 256 for another portion of file 274. Also as illustrated, inode 211 identifies a file data block 253, at tier 250, which contains the actual data for a small file 272. Thus, file 274 spans multiple data blocks, and chain of indirection 200 includes multiple levels of indirection using pointer blocks. This arrangement of multiple layers of indirection may be reflected in pointer block cache 130, and a cache hit on a pointer block that points to another block is followed until a file data block is located.

FIG. 3A illustrates flowchart 300 of exemplary operations associated with reducing file write latency (e.g., using architecture 100). In some examples, the operations of flowchart 300 are performed by one or more computing apparatus 718 of FIG. 7. Operation 301 pre-allocates blocks (e.g. pre-allocated blocks 140) for cache misses. Operation 302 includes waiting for incoming data (e.g., incoming write I/Os). Operation 304 includes receiving incoming data 101 for storage in file 274 and target storage location 102 for incoming data 101. In some examples, target storage location 102 includes a file offset for where incoming data 101 starts within file 274, and a length of incoming data 101. A decision operation 306 includes determining whether target storage location 102 corresponds to any cache entry (within pointer block cache 130) of a plurality of cache entries 131-134.

If there is a cache hit, operation 308 includes, based on at least target storage location 102 corresponding to (or with) a cache entry, writing incoming data 101 to a block indicated by the cache entry (e.g., one of cache entries 131-134). Otherwise, if there is a cache miss, operation 310 includes, based on at least target storage location 102 not corresponding to a cache entry, writing incoming data 101 to a pre-allocated block (e.g, one of pre-allocated blocks 140, such as pre-allocated block 141, 142, 143, or 144), where the pre-allocated block is pre-allocated for cache misses. In some examples, operation 310 further includes journaling the writing of incoming data 101 to the journal. In some examples, writing, the incoming data and journaling the writing are performed in parallel, and so operations 308 and 310 may include writing the journal entry to storage media 120 in parallel with writing incoming data 101 to storage media 120. The journal entry will contain the descriptor of the file being written, its offset number and block number on which the data is written.

Incoming data 101 may fill an entire block, or may have a remainder portion or otherwise be less that a full block. A decision operation 312 includes determining whether the incoming data is aligned to write to an entire block. If there is a full block, operation 314 writes a full block, otherwise, operation 316 writes to a partial block. In some examples, operation 316 includes, based on at least incoming data 101 not being aligned to write to an entire block, recording a length of incoming data 101 and an internal block offset within the journaling (e.g. within journal 121 of FIG. 1). For a misaligned write, along with the guest offset and block address, an offset within the block and the length are also recorded in a journal transaction. The parallel commit. threat (e.g., a background process shown as flowchart 350) reads the prior data and merges it with the newly modified data before writing the data and metadata update corresponding to it. Before the background process has a chance to complete the commit (stitching, merging), if there is a read or a write to this newly partially written block, the prior data is read from the prior block and committed (merged with data in the new block) before allowing the write I/O to proceed. This read-modify-update cycle may be skipped if the second write I/O is aligned write to an entire block.

Operation 318 acknowledges the writing of incoming data 101. Flowchart 300 reaches this acknowledgement more quickly than if, in the case of a cache miss for pointer block cache 130, the pointer blocks were read from storage media 120 to locate the specific file data block of file 274 into which incoming data 101 should be written. Thus, file write latency has been reduced. Incoming data 101 will be written (committed, stitched) into the proper file data block of file 274, but at a later time, by a parallel commit thread that is out of the critical path of the incoming write I/O timeline. Thus, the pre-allocated block, into which incoming data 101 was written in operation 310 is a temporary location in partial write scenarios, but the permanent location in other scenarios, as indicated by operation 358 of flowchart 350 (the commit thread of FIG. 3B).

A decision operation 320 includes monitoring for a commit trigger event. In some examples, the commit trigger event comprises a count of pending journal entries meeting commit trigger threshold 151. When there is a commit trigger, flowchart 350, shown in FIG. 3B kicks off a commit thread (merge process). Operation 322 includes, based at least on completing the committing, freeing the pre-allocated block (to which incoming data 101 was written) or the file data block that held the data in file 274 that was replaced by incoming data 101, whichever block is no longer being used (e.g., see the description of operation 358-364 of flowchart 350).

Operation 324 monitors performance of writing and committing operations so that replenishment threshold 150 and commit trigger threshold 151 may be intelligently adjusted. For example, replenishment threshold 150 and commit trigger threshold 151 may be adjusted upward or downward, based on the current and/or anticipated rate of receiving incoming write I/Os. In some examples, operations 324 monitor, with the ML component of optimization control 115, the latency associated with the availability of the at least one of the blocks within pre-allocated blocks 140 for storing the incoming data (resulting in an adjustment of the size of the pool if replenishment threshold 150 is adjusted). Operation 326 includes dynamically adjusting commit trigger threshold 151, and operation 328 includes dynamically adjusting replenishment threshold 150, for example, based on results of operation 324. Operations 324-328 may be performed in parallel. For example, the pre-allocation and replenishment is an asynchronous operation such that, once triggered, it goes on in parallel or independent of the I/O context. In some examples, operations 326 and 328 dynamically adjust commit trigger threshold 151 and/or replenishment threshold 150 based on burstiness of the incoming data. In some examples, operations 326 and/or 328 are accomplished with the ML component of optimization control 115.

A decision operation 330 includes determining whether to increase a count of blocks pre-allocated for cache misses. In some examples, decision operation 330 includes determining whether the count of blocks pre-allocated for cache misses is below replenishment threshold 150. If there is an insufficient count of blocks pre-allocated for cache misses, operation 332 includes pre-allocating pre-additional blocks for cache misses (e.g., adding more blocks to pre-allocated blocks 140). Flowchart 300 returns to operation 302, while flowchart 350 proceeds in parallel.

FIG. 3B illustrates flowchart 350 of exemplary operations that may be performed in parallel with the operations of flowchart 300. Some examples execute a plurality of parallel committing processes (e.g., identifying groups of dependent transactions and then delegating the individual groups to be processed for commit in parallel). In some examples, the operations of flowchart 350 are performed by one or more computing apparatus 718 of FIG. 7. Operation 352 includes identifying active portion 123 and inactive portion 125 of storage media 120, and operation 354 includes accepting new transactions (e.g., writing incoming data 101) in active portion 123. Operation 355 closes inactive portion 125 to new transactions.

Operation 358 includes committing incoming data 101 (which is currently being held in the pre-allocated block, see operation 310 of flowchart 300) with file 274. There are options for how to perform this. In some scenarios, the incoming data in the pre-allocated block is merged with the pre-allocated block if the incoming data was partial. In some other scenarios, the file's pointer block is changed to point to the pre-allocated block where incoming data 101 already resides. This precludes the need for an expensive data coping operation. The block that is unused after either the copying or the pointer change will be freed in operation 322 of flowchart 300. A decision operation 360 selects between changing a pointer block entry from pointing to a prior block of the file to pointing to the pre-allocated block and copying the incoming data from the pre-allocated block to the prior block. In some examples, decision operation 360 bases the selection on at least an expected performance metric, for example, an expected time to complete each operation. That is, if it is faster to copy than to change the pointer, then the data will be copied. The speed of the copying may depend on whether incoming data 101 is long enough to fill an entire block. or instead fills only a small portion of a block.

If changing the pointer is selected, flowchart 350 moves to operation 362 to change the pointer in the pointer block, and the committing comprises changing a pointer block entry from pointing to a prior block of the file to pointing to the pre-allocated block (where incoming data 101 had been written in operation 310 of flowchart 300). Otherwise, flowchart 350 moves to operation 364 to copy the block and the committing comprises copying incoming data 101 from the pre -allocated block to the prior block. If decision operation 366 determines that the commit process is complete for the identified pre-allocated blocks that had been awaiting committing, then flowchart 350 moves to operation 368 to switch active portion 123 and inactive portion 125, and awaits the next commit trigger, so that the incoming write I/Os that had accumulated during the operation of flowchart 350 may be addressed. Otherwise, flowchart 350 returns to operation 358 to handle additional committing (stitching) tasks.

Figure 3C:
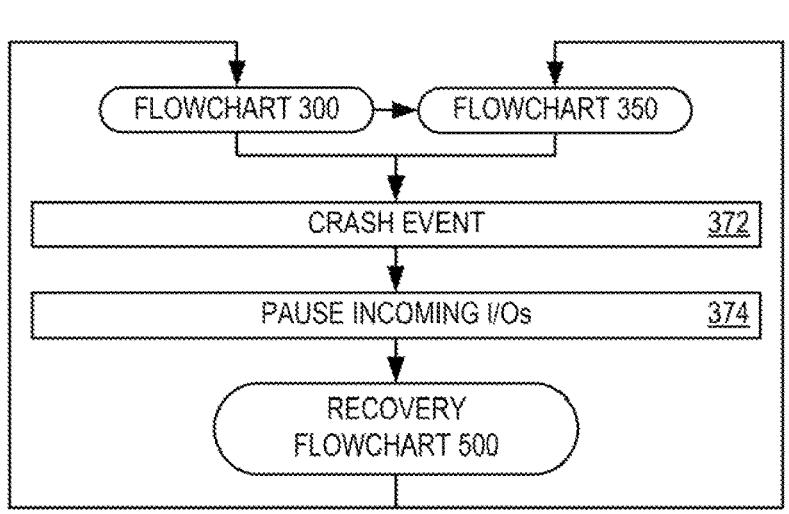

FIG. 3C illustrates a flowchart 370 of exemplary operations associated with flowcharts 300 and 350. In some examples, the operations of flowchart 370 are performed by one or more computing apparatus 718 of FIG. 7. Flowcharts 300 and 350 are operating in parallel, with flowchart 300 periodically triggering flowchart 350. A crash occurs at 372, and operation 374 pauses incoming write I/Os. Error recovery proceeds according to flowchart 500 of FIG. 5, and replays journal 121 to rebuild pointer block cache 130. Failure may occur at any time, and error recovery efforts should ensure that the file system is restored. If a failure occurs during a writing operation, the replay journal 121 provides the restoration. In some examples, there are options for how this occurs. For example, one option could be to complete committing all transactions in the journal, verifying sanity and performing consistency checks of the file system before allowing incoming write I/Os. Another option is to reconstruct pointer block cache 130 from the journal followed by resuming the incoming writes. Consistency checks may occur in parallel.

Figure 4:
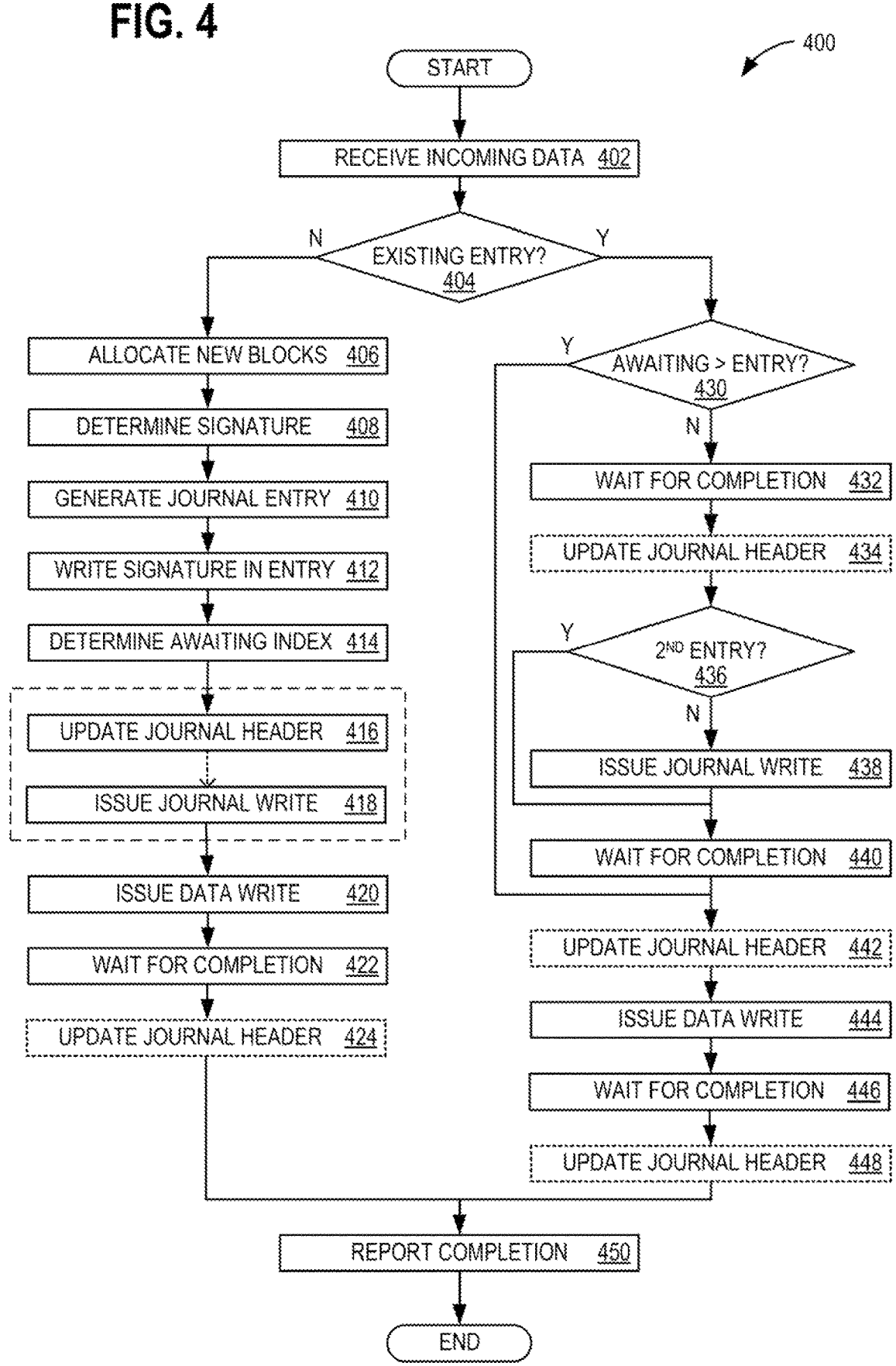
FIG. 4 illustrates a flowchart of exemplary operations that may be performed in conjunction with the flowchart of FIG. 3A.

FIG. 4 illustrates a flowchart 400 of exemplary operations that may be performed in conjunction with flowchart 300. Flowchart 400 illustrates operations for each manifestation of incoming data (e.g., each time a version of incoming data 101 arrives). In situations in which multiple streams of incoming data arrive prior to flowchart 400 completing one of them, a manifestation of flowchart 400 exists for each stream of incoming data may be completed in parallel to process the data streams. In some examples, the operations of flowchart 400 are performed by one or more computing apparatus 718 of FIG. 7. Operation 402 includes receiving incoming data. For each incoming data stream, a new manifestation of flowchart 400 will be spawned. That is, at least some operations of flowchart 400 are performed for each of a plurality of journal entries.

Decision operation 404 includes determining whether incoming data corresponds to an existing journal entry (e.g. as determined using the disk block and file offset). If not, then one or more disk blocks are pre-allocated in operation 406, for example, disk blocks 124a-124d in data area 122. Operation 408 includes determining a signature for the incoming data. In some examples, the signature is a checksum, which is a form of a data signature. In some examples, the signature is an update generation number, which is a form of an update signature. Checksums are determined by calculation logic in journaling control 113. At this stage, the signature is not placed in calculated checksums, because those values are used for validation during error recovery. Rather, at this stage the signature is to be placed in the journal entry.

The journal entry for the incoming data is generated in operation 410. In some examples, this includes determining the file offset and the number of the newly pre-allocated block. The signature is written to the journal entry, for example in the header of the journal entry, in operation 412. The awaiting index is determined in operation 414, and written into the journal header in operation 416. Operation 424 includes, based at least on writing a journal entry to storage media 120, updating a count of journal entries in the journal header. In some examples, updating the awaiting index (in operation 414) is opportunistic and is piggy-backed with the addition of new journal entries to the journal block. Operation 418 issues a journal write. In some examples, operations 416 and 418 are combined and issued as a single I/O operation. Operation 420 issues a data write, which are performed by write control 111. Together, operations 418 and 420 include writing the journal entry and the incoming data to storage media 120, for example in journal 121 and data area 122, respectively. In some examples, writing the journal entry to storage media 120 occurs in parallel with writing the incoming data to storage media 120.

Flowchart 400 waits at 422 for completion of both the journal and data writes. The journal header is optionally updated in operation 424, and is omitted in some examples to reduce I/O burdens. Operation 424 includes, based at least on writing a journal entry to storage media 120, updating a count of journal entries in the journal header. Operation 424 also includes, based at least on writing data to storage media 120, updating an awaiting index in the journal header. The I/O completion is reported in operation 450.

If, in decision operation 404, it is determined that the incoming data does correspond to an existing journal entry, then decision operation 430 determines whether the awaiting index is greater than the existing journal entry number. If so, this means that the first data write operation has completed, a journal update is not needed, and the new data write operation is allowed to proceed. So flowchart 400 skips to operation 442. If the awaiting index is less than the index of the journal entry of the earlier, the first data write operation has not yet completed. A second journal entry is needed but will not be added at this time. Operation 432 includes, based at least on the incoming data corresponding to the existing journal entry, waiting for a data writing operation corresponding to the existing journal entry to complete. Upon completion of the data write, the awaiting index in the journal header is optionally updated in operation 434. Similarly to operation 424, operation 434 is omitted in some examples to reduce I/O burdens.

Decision operation 436 determines whether there is already a second journal entry for the offset. In some examples, a flag in the new journal entry is used to indicate that the entry is for a second write. If so, flowchart 400 skips to operation 440. If not, then operation 438 includes, based at least on completion of the data writing operation corresponding to the existing journal entry, writing a second journal entry. Operation 438 includes corresponding activity to operations 408-414, described herein. Flowchart 400 waits for completion of the write operation at 440 and optionally updates the journal header at 442. Similarly to operation 424, operation 442 is omitted in some examples to reduce I/O burdens. A data write is issued in operation 444, and operation 446 waits for completion at 446. If there are more writes to the same block, they will be blocked until the second journal entry is written to the disk. The journal header is optionally updated at 448 with the number of entries and awaiting index, and I/O data operation completion is reported at 450. Similarly to operation 424, operation 448 is omitted in some examples to reduce I/O burdens.

The ability to perform parallel data and journal writing operations is enabled by placing a signature (e.g., a checksum) of the data block in its journal entry. Before issuing the writes, a checksum is calculated for each new data block and kept in the corresponding journal entry. In some examples, the checksum in the journal entry may be a combined checksum of the data block and its journal entry. By having a combined checksum, a separate checksum to ensure the integrity of the entire journal block can be eliminated. This not only saves space, but also renders the journal more resilient to corruption.

In some examples, if the journal write completes before the data write, the checksum of the disk block is recalculated and compared with the checksum stored in the journal entry. Data writing errors can then be addressed. In some examples, a partial checksum of the data block is written in the next journal block. The checksum is overwritten by the next write operation with the same mapping (e.g., disk block and file offset). The overwriting of the checksum acts as an acknowledgment of the completion of the earlier write operation. With this scheme, a second write operation waits for completion of the earlier write operation before overwriting its checksum. Write operation completion is reported to the issuer after completing both the data and journal writes. Metadata updates occur later possibly in batches in some examples.

The awaiting index is retained in the header of each journal block, as shown in FIGS. 3 and 4. In some examples, when a new journal entry is added to a journal block, the status of the data writes of the earlier journal entries in the journal block is checked. This permits determination of the first journal entry in the journal block whose data or journal write is not yet completed, which is the value of the awaiting index. During a crash recovery described in relation to FIG. 5, the integrity of the newly written data blocks can be validated by calculating the checksums of the data block and comparing them against the checksums stored in the corresponding journal entries. Checksum validation of all the journal entries before the awaiting index is not needed, because those mappings are already known to be valid. That is, only checksums of journal entries starting from the awaiting index require validation. This reduces the number of checksum validations required, thereby speeding recovery operations. If there are duplicate journal entries for the same data block, their checksums are not validated against the data block. By having a checksum for every journal, it is only necessary to discard only those journal entries whose checksum does not match the calculated checksum. Rather than discarding all of the entries, only corrupted entries are discarded.

If another write comes to a block which has an entry already in the journal, due to an earlier write to the same block, the new write is not allowed to proceed until the earlier data and journal writes are completely written to the disk. This is because the checksum of the new data may not match the checksum of the old data that is stored in the log journal. If the host crashes immediately abler the second write, then during the recovery, the system may incorrectly determine that there was as an incomplete write and discard the journal entry and the data. This results in discarding valid data.

Figure 5:
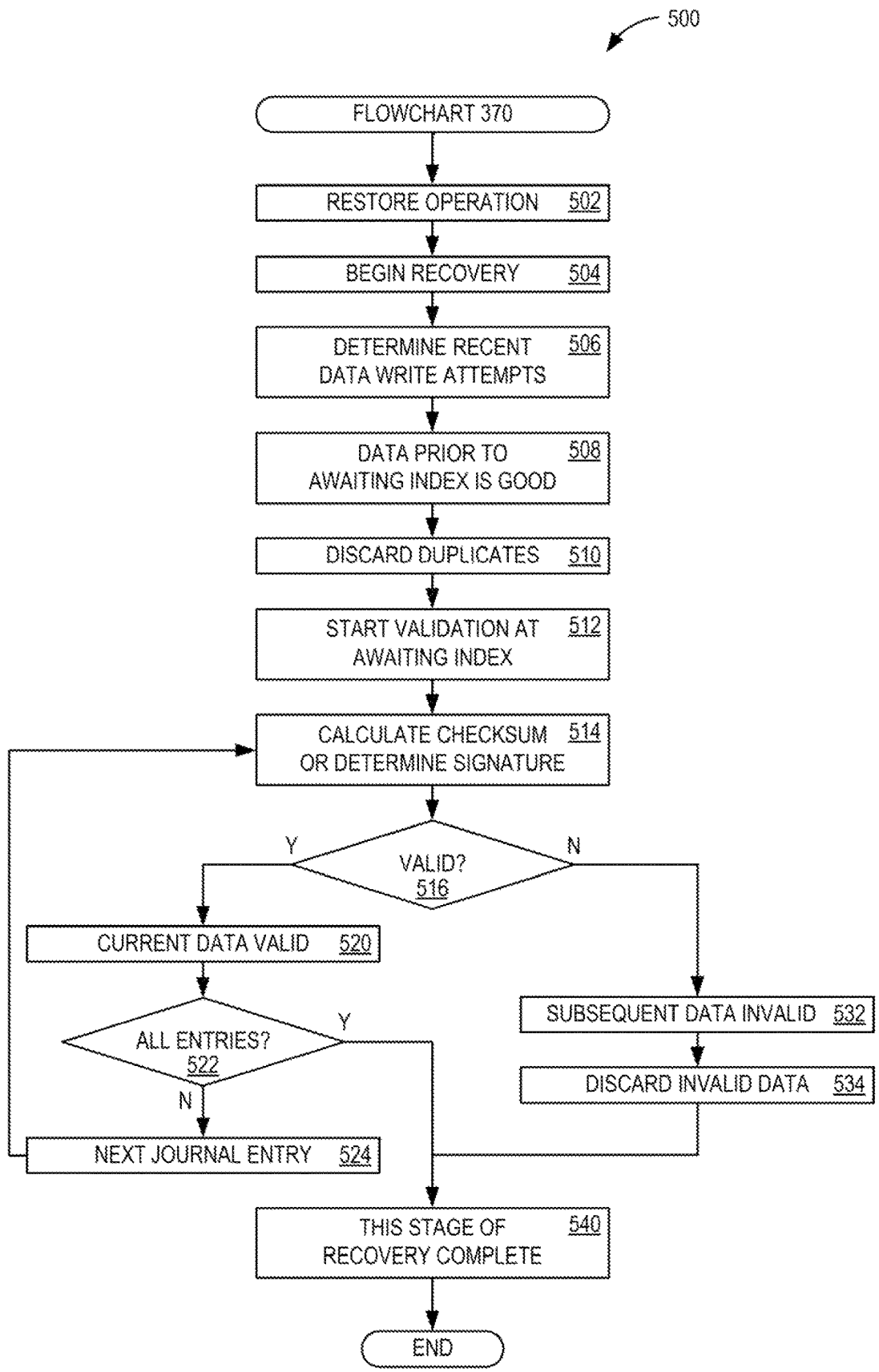
FIG. 5 illustrates another flowchart of exemplary operations that may be performed in conjunction with the flowchart of FIG. 3C.

FIG. 5 illustrates a flowchart 500 of additional exemplary operations that may also be performed in conjunction with flowchart 370. In some examples, the operations of flowchart 500 are performed by one or more computing apparatus 718 of FIG. 7. Operation 502 is triggered by restoring operations of file system 110 after crash event 372 (see flowchart 370). Crash recovery begins at operation 504.

Recent write attempts are determined by examining journal 121 at 506. Operation 506 also includes, based at least on beginning a recovery operation, determining a value of the awaiting index. Operation 508 marks data corresponding to journal entries prior to the awaiting index as good. No validation is needed for that data, saving time. Operation 510 includes discarding duplicate journal entries. Validation begins for journal entries beginning at the value of the awaiting index, at 512. Operation 514 calculates the data checksum or determines the signature. The data in a data block can be validated in multiple ways, such as by using a data signature or using an update signature. A checksum is an example of a data signature, whereas an update generation number is an example of an update signature. If the underlying storage device provides a generation number for every block when it is written, the current generation number of the block can be used as a signature in the journal entry header. During crash recovery, the current generation number of the block is checked against the generation number stored in the journal entry. If the current generation number of the block is greater than the generation number stored in the journal, the block is valid. In some examples, the type of checksum algorithm or whether a generation number is used may be a configurable parameter. Checksums calculated in operation 514 may be saved in calculated checksums, for comparison with checksums within journal 121.

Decision operation 516 determines whether the header signature is valid. In some examples, decision operation 516 includes, for journal entries beginning at the value of the awaiting index, determining validity of a signature in a journal entry. In some examples, decision operation 516 includes determining validity of the signature which comprises calculating a checksum for data corresponding to the journal entry and determining whether the calculated checksum for the data matches the checksum in the journal entry. If the journal entry signature is valid, operation 520 includes, based at least on the signature being valid, determining that data corresponding to the journal entry is valid. If validation has occurred for all entries, as determined by decision operation 522, then operation 540 reports that the current stage of recovery is complete. If more entries remain to be validated, then operation 524 moves to the next journal entry and returns to operation 514. Operation 532 includes, based at least on the signature not being valid, determining that data corresponding to the journal entry and any subsequent journal entry is not valid. Operation 534 discards the invalid data.

Figure 6:
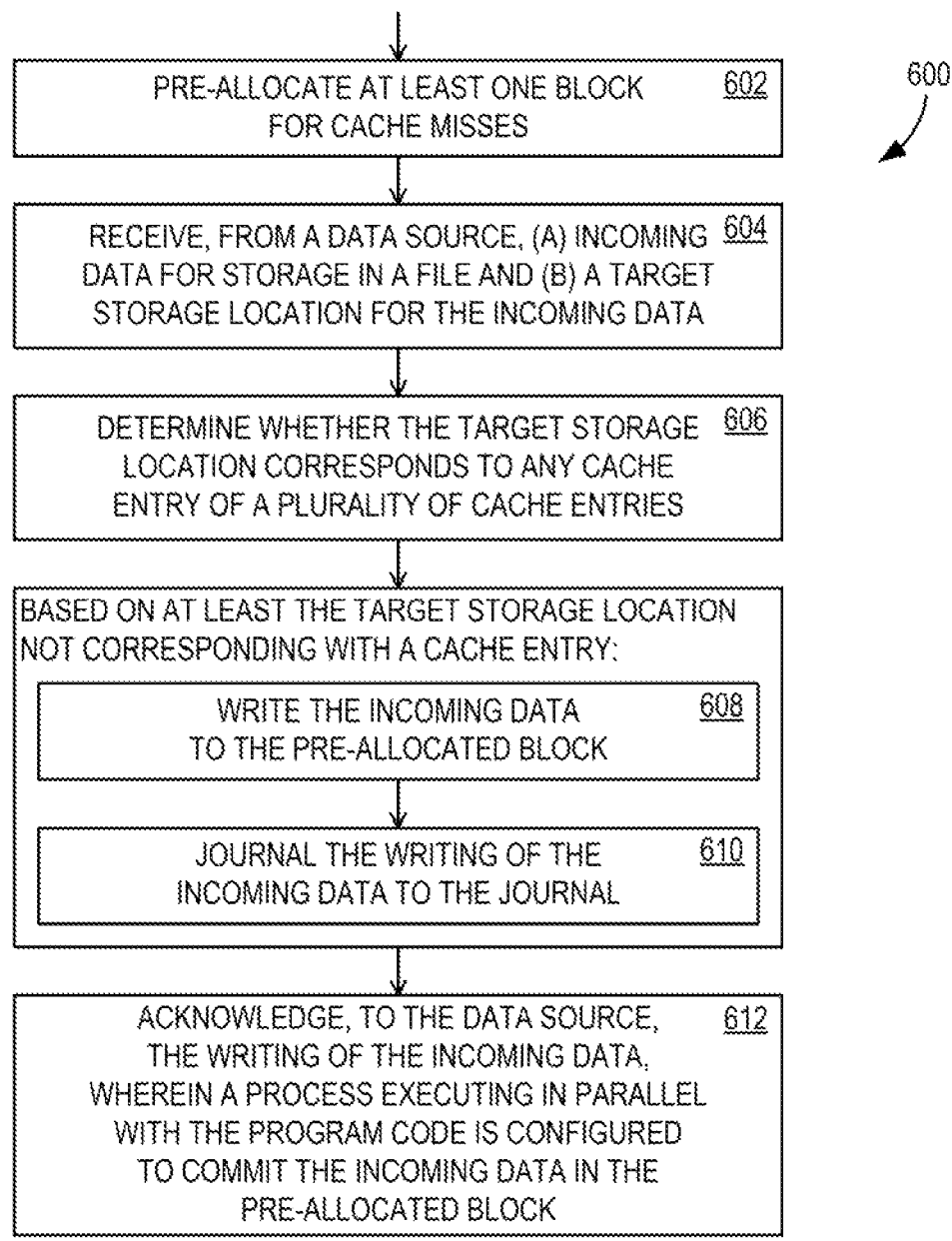
FIG. 6 illustrates another flowchart of exemplary operations associated with the architecture of FIG. 1.

FIG. 6 illustrates a flowchart 600 of exemplary operations associated with reducing file write latency. In some examples, the operations of flowchart 600 are performed by one or more computing apparatus 718 of FIG. 7. Operation 602 includes pre-allocating at least one block for cache misses. Operation 604 includes receiving, from a data source, (a) incoming data for storage in a file and (b) a target storage location for the incoming data. Operation 606 includes determining whether the target storage location corresponds to any cache entry of a plurality of cache entries.

Operations 608 and 610 are based on at least the target storage location not corresponding to a cache entry. Operation 608 includes writing the incoming data to the pre-allocated block. Operation 610 includes journaling the writing of the incoming data to the journal. Operation 612 includes acknowledging, to the data source, the writing of the incoming data, wherein a process executing in parallel with the method is configured to commit the incoming data in the pre-allocated block with the file.

Additional Examples

An example method of reducing file write latency comprises: pre-allocating at least one block for cache misses; receiving, from a data source, (a) incoming data for storage in a file and (b) a target storage location for the incoming data; determining whether the target storage location corresponds to any cache entry of a plurality of cache entries: based on at least the target storage location not corresponding to a cache entry: writing the incoming data to the pre-allocated block, and journaling the writing of the incoming data to the journal: and acknowledging, to the data source, the writing of the incoming data, wherein a process executing in parallel with the method is configured to commit the incoming data in the pre-allocated block with the file.

An example computer system comprises: a processor; and a non-transitory computer readable medium having stored thereon program code, the program code causing the processor to: pre-allocate at least one block for cache misses; receive, from a data source, (a) incoming data for storage in a file and (b) a target storage location for the incoming data; determine whether the target storage. location corresponds to a cache entry; based on at least the target storage location not corresponding to a cache entry; write the incoming data to the pre-allocated block, and journal the writing of the incoming data to the journal; and acknowledge, to the data source, the writing of the incoming data, wherein a process executing in parallel with the program code is configured to commit the incoming data in the pre-allocated block with the file.

An example non-transitory computer storage medium has stored thereon program code executable by a processor, the program code embodying a method comprising: receiving, from a data source, (a) incoming data for storage in a file and (b) a target storage location for the incoming data: determining whether the target storage location corresponds to any cache entry of a plurality of cache entries; based on at least the target storage location not corresponding to a cache entry; writing the incoming data. to the pre-allocated block, and journaling the writing of the incoming data to the journal; and acknowledging, to the data source, the writing of the incoming data, wherein a process executing in parallel with the method is configured to commit the incoming data in the pre-allocated block with the file.

Alternatively, or in addition to the other examples described herein, examples include any combination of the following:
  committing, with a parallel process, the incoming data in the pre-allocated block with the file;
  the committing comprises changing a pointer block entry from pointing to a prior block of the file to pointing to the pre-allocated block;
  the committing comprises copying the incoming data from the pre-allocated block to the prior block;
  based at least on completing the committing, freeing the pre-allocated block or the prior block;
  pre-allocating additional blocks for cache misses;
  based on at least the target storage location corresponding to a cache entry, writing the incoming data to a block indicated by the cache entry;
  determining whether the incoming data is aligned to write to an entire block;
  based on at least the incoming data not being aligned to write to an entire block, recording a length of the incoming data and an internal block offset within the journaling;
  monitoring for a commit trigger event;
  detecting the commit trigger event;
  performing the committing in response to the detected commit trigger event;
  writing the incoming data and journaling the writing are performed in parallel;
  the committing comprises, based on at least an expected performance metric, selecting between: changing a pointer block entry from pointing to a prior block of the file to pointing to the pre-allocated block; and copying the incoming data from the pre-allocated block to the prior block;
  the expected performance metric comprises an expected time to complete;
  the commit trigger event comprises a count of pending journal entries meeting a commit trigger threshold;
  dynamically adjusting the commit trigger threshold;
  executing a plurality of parallel committing processes;
  determining whether to increase a count of blocks pre-allocated for cache misses;
  dynamically adjusting a size of the pre-allocated pool based on a latency associated with availability of at least one of the blocks within the pre-allocated pool for storing the incoming data;
  determining whether to increase the number of blocks pre-allocated for cache misses comprises; determining whether the count of blocks pre-allocated for cache misses is below a replenishment threshold; and
  dynamically adjusting the replenishment threshold.

Exemplary Operating Environment

The present disclosure is operable with a computing device (computing apparatus) according to an embodiment shown as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hardcoded machine. Platform software comprising an operating system 720 or any other suitable platform software may be provided on the computing apparatus 718 to enable application software 721 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, DVDs, CDs, floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose, computing, device When programmed to execute the, instructions described herein.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected front the users. In some examples, notice may be provided to the users of the collection of the data (e.g., via a dialog box or preference setting) and users are given the opportunity to give or deny consent for the monitoring, and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples, of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that. all matter contained in the above description and shown in the accompanying drawings shall be interpreted as illustrative and not in a limiting sense.

What is claimed is:

1. A method of reducing file write latency, the method comprising:
   pre-allocating at least one block for cache misses;
   receiving, from a data source, (a) incoming data for storage in a file and (b) a target storage location for the incoming data;
   determining whether the target storage location corresponds to any cache entry of a plurality of cache entries;
   based on at least the target storage location not corresponding to any of the plurality of cache entries:
      writing the incoming data to the pre-allocated block, and
      journaling the writing of the incoming data to a journal; and
   acknowledging, to the data source, the writing of the incoming data, wherein a process executing in parallel with the method is configured to commit the incoming data in the pro-allocated block with the file.

2. The method of claim 1, wherein pre-allocating at least one block for cache misses comprises:
   pre-allocating a pool of blocks for the cache misses; and
   dynamically adjusting a sit c5f the pre-allocated pool based on a latency associated with availability of at least one of the blocks within the pre-allocated pool for storing the incoming data.

3. The method of claim 1, further comprising:
   based on at least the target storage location corresponding to a cache entry, writing the incoming data to a block indicated by the cache entry.

4. The method of claim 1, further comprising:
   determining whether the incoming data is aligned to write to an entire block; and
   based on at least the incoming data not being aligned to write to an entire block, recording a length of the incoming data and an internal block offset within the journaling.

5. The method of claim 1, wherein commuting the incoming data comprises:
   changing a pointer block entry from pointing to a prior block of the file to pointing to the pre-allocated block; or
   copying the incoming data from the pre-allocated block to the prior block.

6. The method of claim 5, further comprising:
   based at least on completing the committing, freeing the pre-allocated block or the prior block.

7. The method of claim 1, further comprising:
   monitoring for a commit trigger event;
   detecting the commit trigger event; and
   performing the committing in response to the detected commit trigger event.

8. A computer system comprising:
   a processor; and
   a non-transitory computer readable medium having stored thereon program code executable by the processor, the program code causing the processor to:
      pre-allocate at least one block for cache misses;
      receive, from a data source, (a) incoming data for storage in a file and (b) a target storage location for the incoming data;
      determine whether the target storage location corresponds to any cache entry of a plurality of cache entries;
      based on at least the target storage location not corresponding to any of the plurality of cache entries:

write the incoming data to the pre-allocated block, and journal the writing of the incoming data to a journal; and acknowledge, to the data source, the writing of the incoming data, wherein a process executing in parallel with the program code is configured to commit the incoming data in the pre-allocated block with the file.

9. The computer system of claim 8, wherein the program code causes the processor to pre-allocate at least one block for cache misses by:

pre allocating a pool of blocks for the cache misses; and dynamically adjusting a size of the pre-allocated pool based on a latency associated with availability of at least one of the blocks within the 3re-allocated pool for storing the incoming data.

10. The computer system of claim 8, wherein the program code is further operative to:

based on at least the target storage location corresponding to a cache entry, write the incoming, data to a block indicated by the cache entry.

11. The computer system of claim 8, wherein committing the incoming data comprises:

changing a pointer block entry from pointing to a prior block of the file to pointing to the pre- allocated block; or copying the incoming data from the pre-allocated block to the prior block.

12. The computer system of claim 11, wherein the program code is further operative to:

based at least on completing the committing, free the pre-allocated block or the prior block.

13. The computer system of claim 8, wherein the program code is further operative to:

monitor for a commit trigger event;

detect the commit trigger event; and perform the commit in response to the detected commit trigger event.

14. The computer system of claim 13, wherein the commit trigger event comprises a count of pending journal entries meeting a commit trigger threshold, and wherein the program code is further operative to:

dynamically adjust the commit trigger threshold based on burstiness of the incoming data.

15. A non-transitory computer storage medium having stored thereon program code executable by a processor, the program code embodying a method comprising:

pre-allocating at least one block for cache misses;

receiving, from a data source, (a) incoming data for storage in a file and (b) a target storage location for the incoming data;

determining whether the target storage location corresponds to any cache entry of a plurality of cache entries;

based on at least the target storage location not corresponding to any of the plurality of cache entries:

writing the incoming data to the pre-allocated block, and journaling the writing of the incoming data to a journal; and acknowledging, to the data source, the writing of the incoming data, wherein a process executing in parallel with the program code is configured to commit the incoming data in the pre-allocated block with the file.

16. The computer storage medium of claim 15, wherein pre-allocating at least one block for cache misses comprises:

pre-allocating a pool of blocks for the cache misses; and dynamically adjusting a size of the pre-allocated pool based on a latency associated with availability of at least one of the blocks within the pre-allocated pool for storing the incoming data.

17. The computer storage medium of claim 15, wherein the program code further comprises:

based on at least the target storage location corresponding to a cache entry, writing the incoming data to a block indicated by the cache entry.

18. The computer storage medium of claim 15, wherein the program code further comprises:

determining whether the incoming data is aligned to write to an entire block; and based on at least the incoming data not being aligned to write to an entire block, recording a length of the incoming data and an internal block offset within the journaling.

19. The computer storage medium of claim 15, wherein committing the incoming data comprises:

changing a pointer block entry from pointing to a prior block of the file to pointing to the pre-allocated block; or copying the incoming data from the pre-allocated block to the prior block.

20. The computer storage medium of claim 19, wherein the program code further comprises:

based at least on completing the committing, freeing the pre allocated block or the prior block.

* * * * *